(12) United States Patent
Ichikawa

(10) Patent No.: US 10,922,034 B2
(45) Date of Patent: Feb. 16, 2021

(54) INFORMATION PROCESSING APPARATUS, INFORMATION PROCESSING SYSTEM, AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Takehiro Ichikawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/512,387

(22) Filed: Jul. 16, 2019

(65) Prior Publication Data
US 2020/0310713 A1 Oct. 1, 2020

(30) Foreign Application Priority Data
Mar. 25, 2019 (JP) .................................. 2019-057419

(51) Int. Cl.
*G06F 3/12* (2006.01)
*H04N 1/44* (2006.01)
*G06F 21/60* (2013.01)

(52) U.S. Cl.
CPC .......... *G06F 3/1238* (2013.01); *G06F 3/1222* (2013.01); *G06F 21/608* (2013.01); *H04N 1/442* (2013.01); *H04N 1/4413* (2013.01)

(58) Field of Classification Search
CPC .............................. G06F 3/1238; G06F 3/1222
See application file for complete search history.

(56) References Cited

U.S. PATENT DOCUMENTS

| 2009/0067000 | A1* | 3/2009 | Takiyama | G06F 3/1222 358/1.15 |
| 2014/0164249 | A1 | 6/2014 | Guerrino et al. | |
| 2015/0215319 | A1* | 7/2015 | Koeten | H04L 63/10 726/1 |
| 2016/0125199 | A1* | 5/2016 | Lee | G06F 21/316 726/28 |

FOREIGN PATENT DOCUMENTS

| JP | 2011221847 | 11/2011 |
| JP | 5662383 | 1/2015 |
| JP | 2015534138 | 11/2015 |

* cited by examiner

*Primary Examiner* — Ibrahim Siddo
(74) *Attorney, Agent, or Firm* — JCIPRNET

(57) ABSTRACT

An information processing apparatus includes a reception unit that receives information to be registered from a user who is authenticated using authentication information for which a trust relationship is established in advance in a trust framework, and a setting unit that sets an assurance level among a plurality of predetermined assurance levels using the information to be registered which is received by the reception unit and registration information registered in advance.

19 Claims, 10 Drawing Sheets

FIG. 5

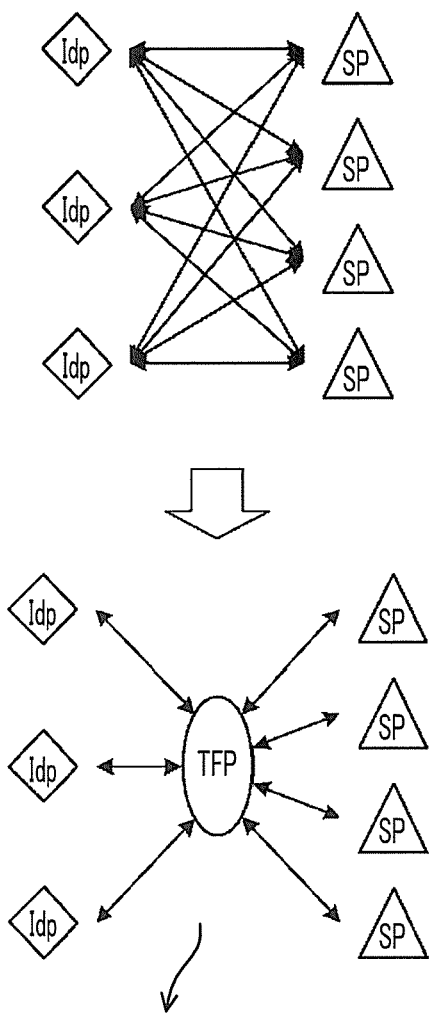

| ASSURANCE LEVEL | EXPLANATION |
|---|---|
| 1-Low | NON-NECESSITY OF CONFIRMATION OF IDENTIFICATION, ANONYM (IDENTITY OF USER), NO EXPIRATION DATE |
| 2-Medium | NECESSITY OF CONFIRMATION OF IDENTIFICATION (IDENTIFICATION CARD), SINGLE FACTOR AUTHENTICATION, INVALIDATION PROCESSING, PLAINTEXT PW HOLDING X |
| 3-High | MULTIPLE-FACTOR AUTHENTICATION (SOFTWARE TOKEN IS POSSIBLE) |
| 4-Very Hight | ISSUE BY FACING, HARDWARE TOKEN, ENHANCEMENT OF ENCRYPTION AFTER AUTHENTICATION |

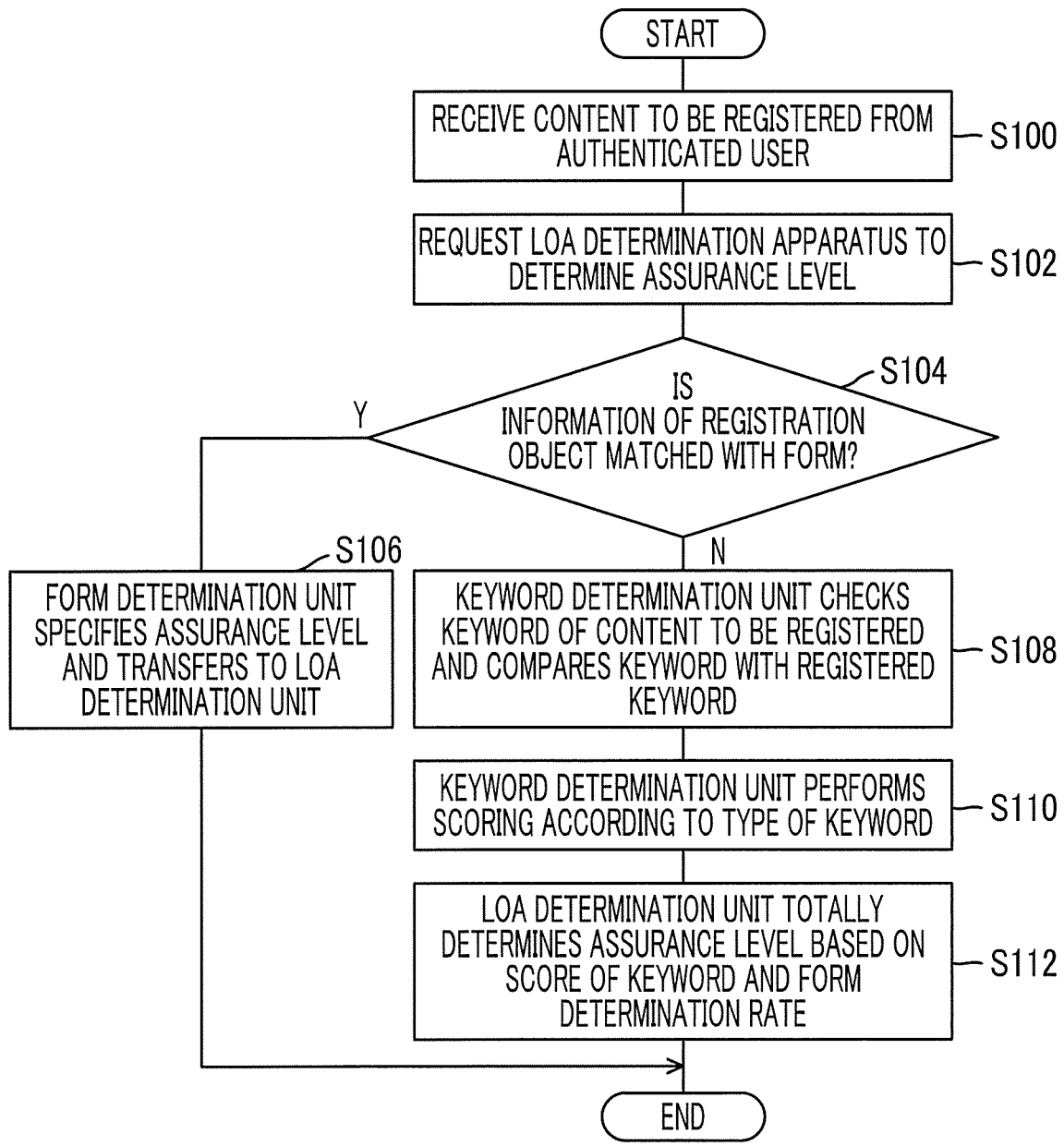

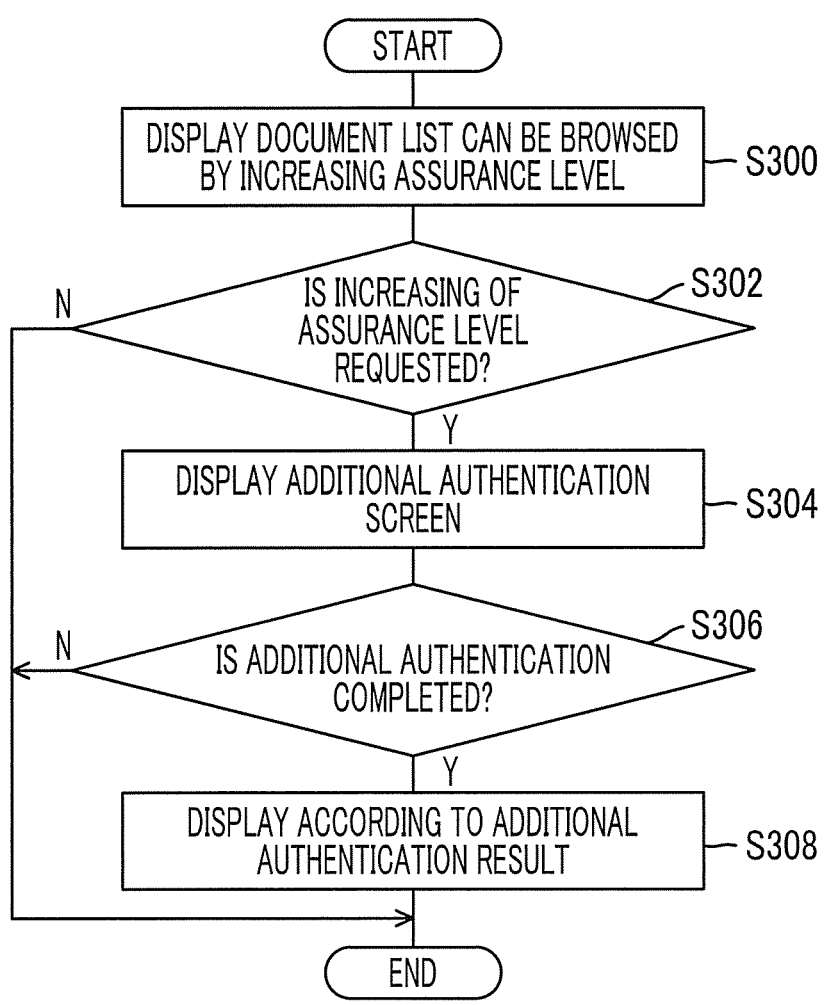

FIG. 11

```
DEVELOPMENT 3G MFP RELATED                          [ READ ]
  [ ] 20181218 MINUTES.txt
  [ ] MFP OPERATION MANUAL.pdf

[ BROWSE ]  [ PRINT ]
LIST OF DOCUMENT ACCESSIBLE BY INCREASING ASSURANCE LEVEL
  User A EVALUATION.pdf        :LEVEL 2
  Project PLAN.xlsx            :LEVEL 2     [ ADDITIONAL    ]
  X COMPANY CASE DATA.xlsx     :LEVEL 3     [ AUTHENTICATION ]
```

```
OXOX ADDITIONAL AUTHENTICATION
  [ ASSURANCE LEVEL ]   [ 2 ] [▼]

PLEASE PERFORM BIOMETRIC AUTHENTICATION
  ON IMAGE FORMING APPARATUS.
```

```
DEVELOPMENT 3G MFP RELATED                          [ READ ]
  [ ] 20181218 MINUTES.txt
  [ ] MFP OPERATION MANUAL.pdf
  [ ] User A EVALUATION.pdf
  [ ] X COMPANY CASE DATA.xlsx

[ BROWSE ]  [ PRINT ]
LIST OF DOCUMENT ACCESSIBLE BY INCREASING ASSURANCE LEVEL
  X COMPANY CASE DATA.xlsx     :LEVEL 3     [ ADDITIONAL    ]
                                            [ AUTHENTICATION ]
```

INFORMATION PROCESSING APPARATUS, INFORMATION PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-057419 filed Mar. 25, 2019.

BACKGROUND

(i) Technical Field

The present invention relates to an information processing apparatus, an information processing system, and a non-transitory computer readable medium storing an information processing program.

(ii) Related Art

In JP2011-221847A, there is proposed an image forming apparatus including a code authentication unit that performs authentication of a user using code information; a biometric authentication unit that further performs authentication of the user using biometric information representing a physical feature of the user; an operation display unit that receives an instruction from the user and displays document data to be secret according to the instruction; an image processing unit that performs image processing for displaying, printing, or transmission to an external apparatus of contents of the document data; and a control unit that controls the code authentication unit, the biometric authentication unit, the image processing unit, and the operation display unit, in which the control unit performs a control so as to display not the contents of the document data but an attribute related to the document data in a stage where authentication by the code authentication unit is performed, and so as to receive an instruction related to displaying, printing, or transmission to an external apparatus of the contents of the document data in a stage where authentication by the biometric authentication unit is performed.

In JP2015-534138A, there is proposed a method of selectively allowing an access to two or more sets of information, to which a plurality of different security levels are assigned, via a computer network, in which an access to information with a lower secret level requires authentication processing requesting only a user ID and a password, and in which an access to information with a higher secret level requires authentication processing requesting a user ID, a password, and a hardware token without requesting an additional PIN.

In JP5662383B, there is proposed an information processing apparatus including: an ID determination unit that determines an ID of a user which is to be provided to a server so as to determine whether to provide a service to the user based on the ID received from the user; a reliability determination unit that determines reliability as an index value indicating strength of a relationship between the ID determined by the ID determination unit and the user of the information processing apparatus; and an ID providing unit that provides the ID determined by the ID determining unit and the reliability determined by the reliability determination unit to the server so as to determine whether to provide a service, in which the reliability determination unit determines a level of the reliability according to a provision result of the ID determined by the ID determination unit to the server.

SUMMARY

In a case where information such as document information is registered in a cloud service, it is necessary that a user individually sets an assurance level for the information to be registered. Aspects of non-limiting embodiments of the present disclosure relate to an information processing apparatus, an information processing system, and a non-transitory computer readable medium storing an information processing program, which allow a user to set an assurance level without individually setting the assurance level in a case where information is registered in a cloud service.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including: a reception unit that receives information to be registered from a user who is authenticated using authentication information for which a trust relationship is established in advance in a trust framework; and a setting unit that sets an assurance level among a plurality of predetermined assurance levels using the information to be registered which is received by the reception unit and registration information registered in advance.

BRIEF DESCRIPTION OF THE DRAWINGS

Exemplary embodiment(s) of the present invention will be described in detail based on the following figures, wherein:

FIG. 5 is a diagram for explaining a trust framework and an LOA;

FIG. 6 is a flowchart illustrating an example of a flow of assurance level determination processing performed by the cloud server of the information processing system according to the exemplary embodiment in a case where content is registered in the cloud server providing the content management service;

FIG. 10 is a flowchart illustrating an example of a flow of processing performed by the cloud server of the information processing system according to the exemplary embodiment in a case where the assurance level is changed by the cloud server providing the content management service; and FIG. 11 is a diagram for explaining an example in which the assurance level is changed during login.

DETAILED DESCRIPTION

Figure 1:
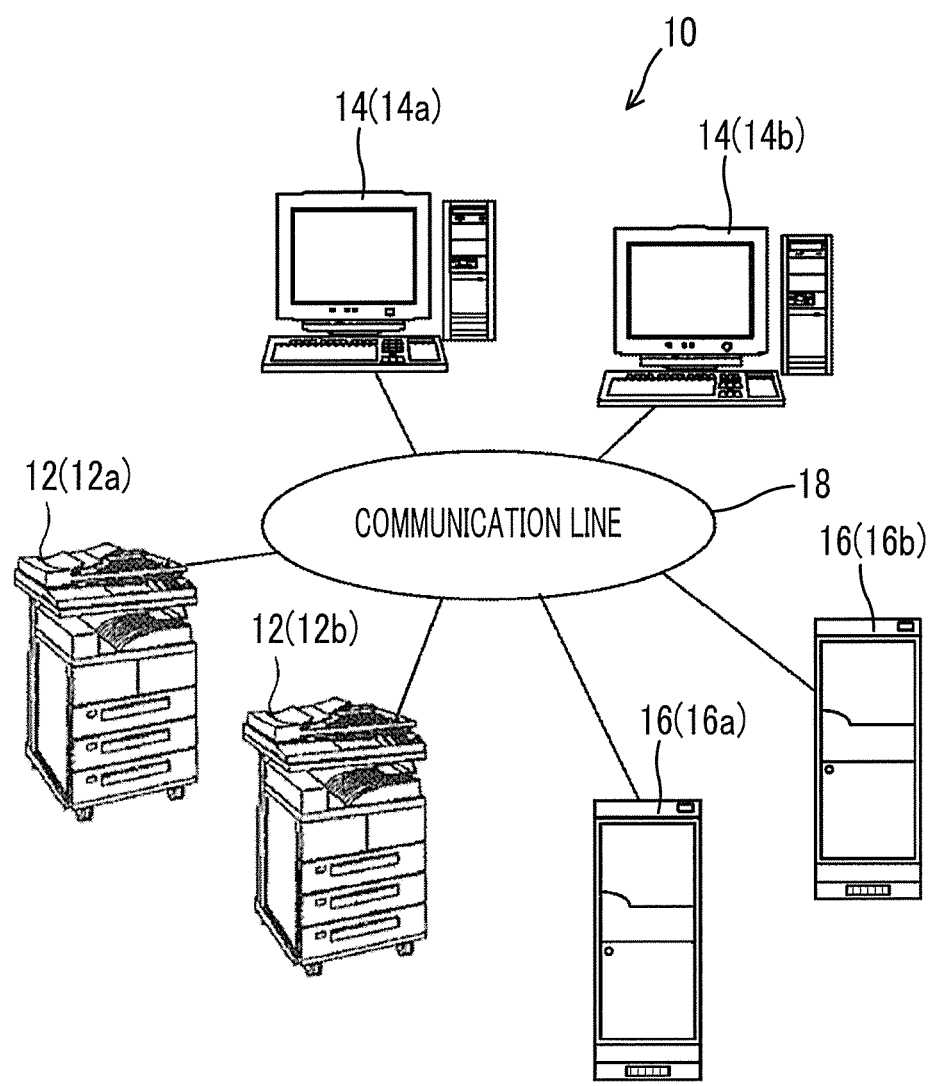
FIG. 1 is a diagram illustrating a schematic configuration of an information processing system according to an exemplary embodiment.

Hereinafter, an example of an exemplary embodiment will be described in detail with reference to the accompanying drawings. In the exemplary embodiment, an information processing system in which a plurality of image forming apparatuses, a plurality of information processing terminals, and a plurality of cloud servers are connected to each other via a communication line such as a network will be described as an example. FIG. 1 is a diagram illustrating a schematic configuration of an information processing system 10 according to the exemplary embodiment.

As illustrated in FIG. 1, the information processing system 10 according to the exemplary embodiment includes a plurality of image forming apparatuses 12a, 12b, . . . , a plurality of information processing terminals 14a, 14b, . . . , and a plurality of cloud servers 16a, 16b, . . . . In a case where there is no need to distinguish the image forming apparatuses 12a, 12b, . . . , the information processing terminals 14a, 14b, . . . , and the cloud servers 16a, 16b, . . . , alphabets at the end of the numerals may be omitted. Further, in the exemplary embodiment, an example in which the plurality of image forming apparatuses 12a, 12b, . . . , and information processing terminals 14a, 14b, . . . are included will be described. On the other hand, at least one image forming apparatus 12 and at least one information processing terminal 14 may be included. Further, the image forming apparatus 12 corresponds to an image generation apparatus, the information processing terminal 14 corresponds to a terminal apparatus, and the cloud server 16 corresponds to an information processing apparatus.

The image forming apparatus 12, the information processing terminal 14, and the cloud server 16 are connected to each other via a communication line 18 such as a local area network (LAN), a wide area network (WAN), the Internet, or an intranet. Thus, various data can be transmitted and received between the image forming apparatus 12, the information processing terminal 14, and the cloud server 16 via the communication line 18.

Figure 2:
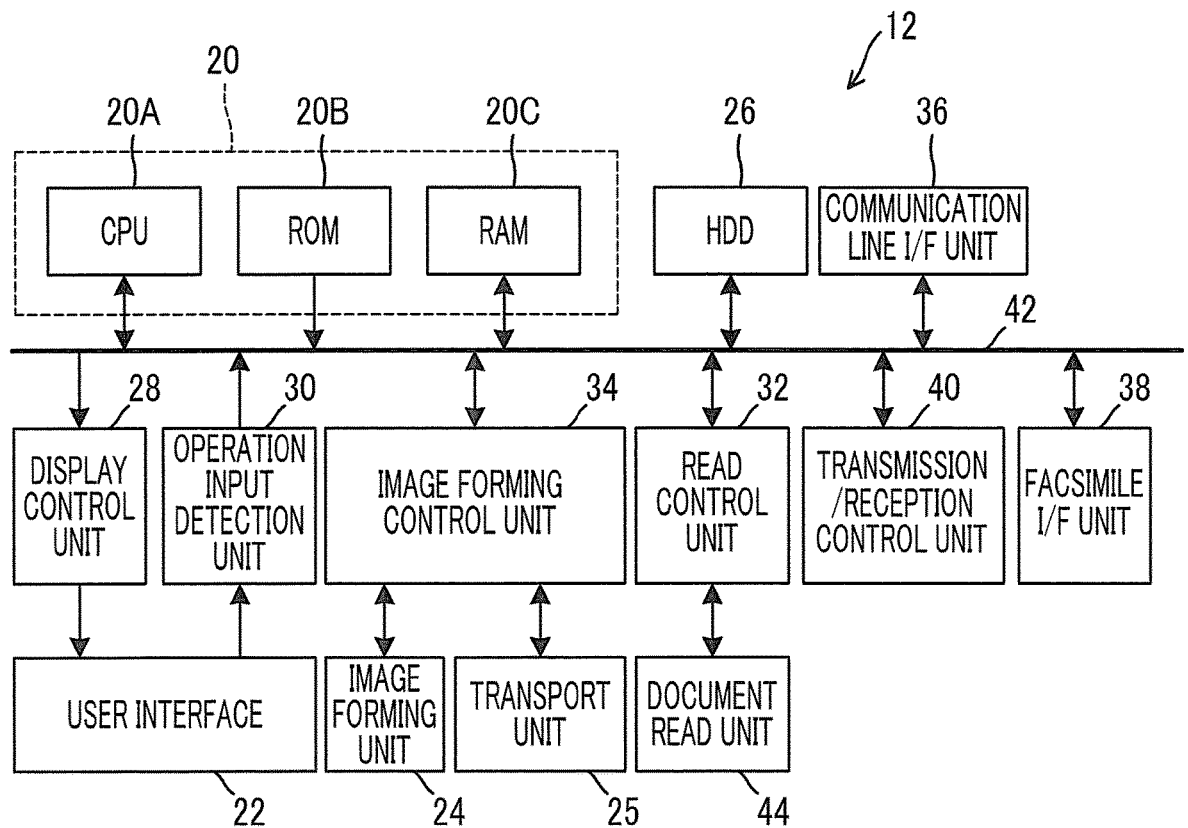
FIG. 2 is a block diagram illustrating a main configuration of an electrical system of an image forming apparatus according to the exemplary embodiment.

FIG. 2 is a block diagram illustrating a main configuration of an electrical system of the image forming apparatus 12 according to the exemplary embodiment.

As illustrated in FIG. 2, the image forming apparatus 12 according to the exemplary embodiment includes a control unit 20 including a central processing unit (CPU) 20A, a read only memory (ROM) 20B, and a random access memory (RAM) 20C. The CPU 20A controls the entire operation of the image forming apparatus 12. The RAM 20C is used as a work area or the like when the CPU 20A executes various programs. The ROM 20B stores various control programs and various parameters in advance. In the image forming apparatus 12, the components of the control unit 20 are electrically connected to each other via a system bus 42.

On the other hand, the image forming apparatus 12 according to the exemplary embodiment includes a hard disk drive (HDD) 26 that stores various data such as user information, setting parameters, and defect information, application programs, and the like. Further, the image forming apparatus 12 includes a display control unit 28 that is connected to a user interface 22 and controls display of various operation screens on a display of the user interface 22. Further, the image forming apparatus 12 includes an operation input detection unit 30 that is connected to the user interface 22 and detects an operation instruction which is input via the user interface 22. In the image forming apparatus 12, the HDD 26, the display control unit 28, and the operation input detection unit 30 are electrically connected to the system bus 42. In the image forming apparatus 12 according to the exemplary embodiment, the HDD 26 is used as a memory unit. On the other hand, the present disclosure is not limited thereto, and a non-volatile memory unit such as a flash memory may be used.

Further, the image forming apparatus 12 according to the exemplary embodiment includes a read control unit 32, which controls a read operation of an optical image by a document read unit 44 and a document transport operation by a document transport unit, and an image forming control unit 34, which controls image forming processing by an image forming unit 24 and transport of paper to the image forming unit 24 by a transport unit 25. Further, the image forming apparatus 12 includes a communication line interface (I/F) unit 36 that is connected to the communication line 18 and transmits and receives communication data to and from other external apparatuses such as the cloud server 16 connected to the communication line 18. Further, the image forming apparatus includes a facsimile interface (I/F) unit 38 that is connected to a telephone line (not illustrated) and transmits and receives facsimile data to and from a facsimile machine connected to the telephone line. Further, the image forming apparatus 12 includes a transmission/reception control unit 40 that controls transmission/reception of facsimile data via the facsimile I/F unit 38. In the image forming apparatus 12, the transmission/reception control unit 40, the read control unit 32, the image forming control unit 34, the communication line I/F unit 36, and the facsimile I/F unit 38 are electrically connected to the system bus 42.

With the configuration, in the image forming apparatus 12 according to the exemplary embodiment, the CPU 20A accesses each of the RAM 20C, the ROM 20B, and the HDD 26. Further, in the image forming apparatus 12, the CPU 20A controls display of information such as operation screens and various messages on a display of the user interface 22 via the display control unit 28. Further, in the image forming apparatus 12, the CPU 20A controls operations of the document read unit 44 and the document transport unit via the read control unit 32. Further, in the image forming apparatus 12, the CPU 20A controls operations of the image forming unit 24 and the transport unit via the image forming control unit 34, and controls transmission and reception of communication data via the communication line I/F unit 36. Further, in the image forming apparatus 12, the CPU 20A controls transmission/reception of facsimile data via the facsimile I/F unit 38 by the transmission/reception control unit 40. Further, in the image forming apparatus 12, the CPU 20A recognizes operation contents of the user interface 22 based on operation information detected by the operation input detection unit 30, and executes various controls based on the operation contents.

Figure 3:
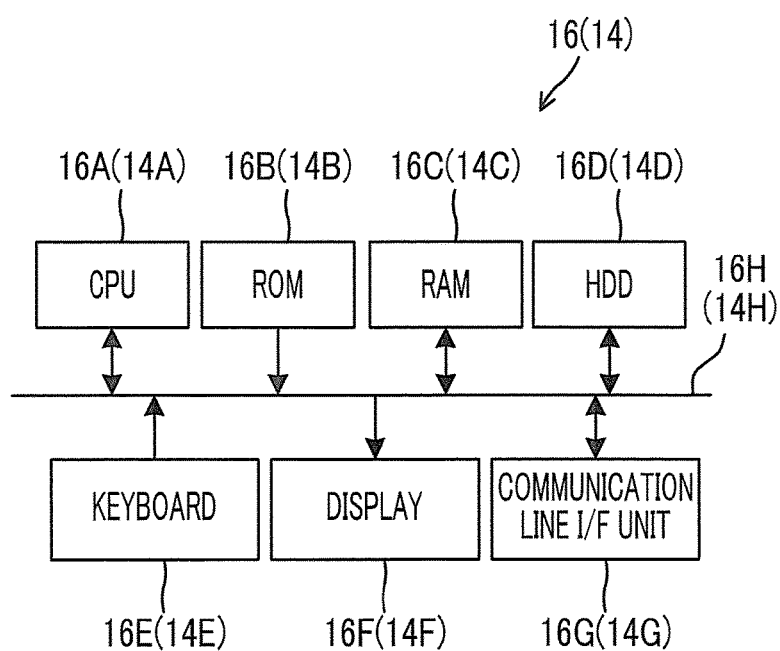
FIG. 3 is a block diagram illustrating a main configuration of an electrical system of each of an information processing terminal and a cloud server according to the exemplary embodiment.

Next, a main configuration of an electric system of each of the information processing terminal 14 and the cloud server 16 according to the exemplary embodiment will be described. FIG. 3 is a block diagram illustrating a main configuration of an electrical system of each of the information processing terminal 14 and the cloud server 16 according to the exemplary embodiment. The information processing terminal 14 and the cloud server 16 are basically configured with general computers. Thus, in this description, the cloud server 16 will be representatively described.

As illustrated in FIG. 3, the cloud server 16 according to the exemplary embodiment includes a CPU 16A, a ROM 16B, a RAM 16C, an HDD 16D, a keyboard 16E, a display 16F, and a communication line interface (I/F) unit 16G. The CPU 16A controls the entire operation of the cloud server 16. The ROM 16B stores various control programs and various parameters in advance. The RAM 16C is used as a work area or the like when the CPU 16A executes various programs. The HDD 16D stores various data, application programs, and the like. The keyboard 16E is used to input various information. The display 16F is used to display various information. The communication line I/F unit 16G is connected to the communication line 18, and transmits and receives various data to and from other apparatuses connected to the communication line 18. The units of the cloud server 16 are electrically connected to each other by a system bus 16H. In the cloud server 16 according to the exemplary embodiment, the HDD 16D is used as a memory unit. On the other hand, the present disclosure is not limited thereto, and a non-volatile memory unit such as a flash memory may be used.

With the configuration, in the cloud server 16 according to the exemplary embodiment, the CPU 16A accesses each of the ROM 16B, the RAM 16C, and the HDD 16D, acquires various data via the keyboard 16E, and displays various information on the display 16F. Further, in the cloud server 16, the CPU 16A controls transmission and reception of communication data via the communication line I/F unit 16G.

In the information processing system 10 with the above-described configuration, the information processing terminal 14 and the image forming apparatus 12 can use a cloud service provided by the cloud server 16. As an example of the cloud service, in the exemplary embodiment, an example in which the cloud server 16 provides a content management service and a user management/authentication service as an example will be described. In the exemplary embodiment, an example in which separate cloud servers 16 respectively provide the content management service and the authentication service as a cloud service will be described. On the other hand, the services may be provided from a single cloud server 16.

In a case where the information processing terminal 14 accesses the cloud server 16 and stores electronic information such as document information or image information in the cloud server 16, the content management service allows browsing of the electronic information which is stored in the cloud server 16 and is a management target.

On the other hand, the user management/authentication service performs authentication in a case where various cloud services such as a content management service are used. For example, the user management/authentication service registers a user in advance, and sets and stores user identification information (hereinafter, referred to as a user ID) and a password in a database or the like. In a case where a cloud service such as a content management service is used, the user management/authentication service performs authentication as to whether or not the user is a registered user.

Figure 4:
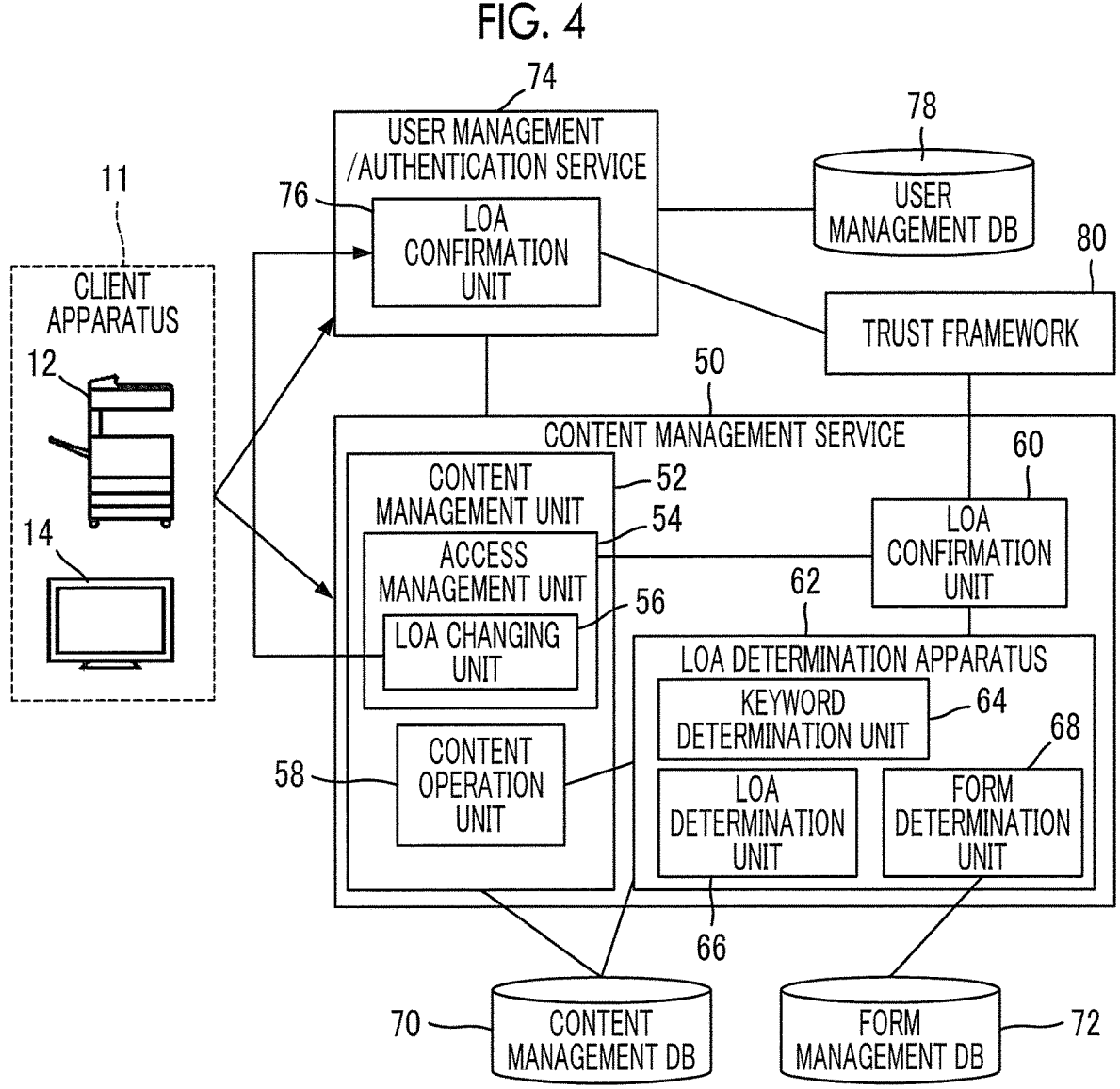
FIG. 4 is a functional block diagram illustrating a functional configuration of the cloud server of the information processing system according to the exemplary embodiment in a case where the cloud server provides a user management/authentication service and a content management service.

FIG. 4 is a functional block diagram illustrating a functional configuration of the cloud server 16 of the information processing system 10 according to the exemplary embodiment in a case where the cloud server 16 provides a user management/authentication service and a content management service.

A user management/authentication service 74 performs user authentication and user information management for a user who uses a client apparatus 11 such as the image forming apparatus 12 or the information processing terminal 14. The user management/authentication service 74 registers a user in advance, sets authentication information such as a user ID and a password, and stores the authentication information in a user management database (DB) 78. In a case where a content management service 50 is used, the user management/authentication service 74 performs authentication as to whether or not the user is a registered user. In the exemplary embodiment, authentication is performed using a trust framework (TF) 80. The trust framework 80 is a trust-based framework in which authentication information is distributed on online among authorized businesses based on agreement of a user. In a case where the user management/authentication service 74 is used, there is need to establish a trust relationship between an identity provider (IDP) providing the user management/authentication service 74 and an relying party (RP) which is a service such as the content management service 50 used by the IDP. In a case where a trust relationship is not established, the IDP may doubt whether the RP uses user information for other purposes. Further, the RP using the IDP may doubt whether or not an attribute which is set in the IDP is correct. In related art, as illustrated in an upper part of FIG. 5, each IDP is individually contracted with each service provider (SP) of the RP. On the other hand, in the exemplary embodiment, authentication is performed using authentication information for which a trust relationship is established in advance in the trust framework 80 in which the IDP and the SP trust each other. In the trust framework 80, there is a standard called a level of assurance (LOA, assurance level) as a framework for allowing the IDP and the RP to trust each other, and thus use of a service is allowed only in a case where the IDP and the RP are in the same assurance level. For example, as illustrated in a lower part of FIG. 5, the LOA has four levels of "1—LOW", "2—Medium", "3—High", and "4—Very high". In "1—LOW", non-necessity of confirmation of identification, use of an anonym, and no expiration date are set. In "2—Medium", necessity of confirmation of identification, single factor authentication, invalidation processing, and non-holding (x) of a plain text PW (password) are set. In "3—High", multiple-factor authentication using a software token is set. In "4—Very high", an issuance of a token using face authentication, a hardware token, and enhancement of encryption after authentication are set.

The user management/authentication service 74 has a function of an LOA confirmation unit 76 that allows each of the IDP and the RP to confirm an assurance level of the other party.

The content management service 50 has functions of a content management unit 52 as a reception unit, an LOA confirmation unit 60, and an LOA determination apparatus 62 as a setting unit.

The content management unit 52 has functions of an access management unit 54 as an authentication reception unit and a content operation unit 58 as a display unit, and manages an access and a registration of information stored in the content management database (DB) 70. For example, the content management unit 52 allows a user for whom determination of an assurance level is completed to access content stored in the content management DB 70 according to an assurance level.

The access management unit 54 has a function of an LOA changing unit 56 as an additional authentication reception unit, and manages an access to the content management DB 70. The LOA changing unit 56 changes an assurance level of a logged-in user. For example, in a case where it is necessary to increase an access level, the LOA changing unit 56 receives a change request of an assurance level from the client apparatus 11, inquires of the user management/authentication service 74 a change of an assurance level, and changes an assurance level. Specifically, the LOA changing unit 56 prompts the client apparatus 11 to perform additional authentication, receives a request of additional authentication by acquiring information for additional authentication from the client apparatus 11, and changes an assurance level by registering the acquired information in the user management/authentication service 74.

The content operation unit 58 performs an operation to the content stored in the content management DB 70 according to a determination result of an assurance level by the LOA determination apparatus 62.

The LOA confirmation unit 60 allows each of the IDP and the RP to confirm an assurance level of the other party. Specifically, the LOA confirmation unit 60 requests the trust framework 80 to confirm an assurance level based on the user ID and the password acquired from the client apparatus 11, and notifies the LOA determination unit 66 of the confirmation result.

The LOA determination apparatus 62 has functions of a keyword determination unit 64, an LOA determination unit 66, and a form determination unit 68, and sets an assurance level, among a plurality of predetermined assurance levels, using content to be registered and registration information registered in advance.

In a case where content is registered, the keyword determination unit 64 calculates a value for determining an assurance level by determining a type of a keyword or the like. For example, the keyword determination unit 64 calculates a value for determining an assurance level by performing scoring according to a type of a keyword (for example, a keyword in a medical field, a keyword in a law field, or the like).

In a case where content is registered, the keyword determination unit 64 checks a keyword of content to be registered, and compares the keyword with a registered keyword. For example, the keyword determination unit 64 calculates a value for determining an assurance level by comparing types of keywords or the like. For example, the keyword determination unit 64 calculates a value for determining an assurance level by performing scoring according to a type of a keyword (for example, a keyword in a medical field, a keyword in a law field, or the like).

In a case where content is registered in the content management DB 70 or in a case where an access to content stored in the content management DB 70 is performed, the LOA determination unit 66 determines an assurance level of a user as a request source based on the confirmation result of the LOA confirmation unit 60.

Subsequently, specific processing performed by the cloud server 16, which provides the content management service 50, included in the information processing system 10 with the configuration according to the exemplary embodiment will be described.

First, assurance level determination processing performed by the cloud server 16 in a case where content is registered in the content management service 50 will be described. FIG. 6 is a flowchart illustrating an example of a flow of assurance level determination processing performed by the cloud server 16 of the information processing system 10 according to the exemplary embodiment in a case where content is registered in the cloud server 16 providing the content management service 50. The process in FIG. 6 is started in a case where a user logs in and instructs content registration by operating the image forming apparatus 12 or the information processing terminal 14.

In step S100, the content management unit 52 receives content to be registered from an authenticated user, and the process proceeds to step S102.

In step S102, the access management unit 54 requests the LOA determination apparatus 62 to determine an assurance level, and the process proceeds to step S104.

In step S104, the form determination unit 68 determines whether or not the content to be registered matches with a form registered in advance in the form management DB 72. In this determination, for example, the form determination unit 68 compares the content to be registered with a document format of a form stored in the form management DB 72. In a case where the determination result is Yes, the process proceeds to step S106, and in a case where the determination result is No, the process proceeds to step S108.

In step S106, the form determination unit 68 specifies an assurance level and transfers the assurance level to the LOA determination unit 66, and the assurance level determination processing is ended. That is, in a case where there is a form matching with the content to be registered, an assurance level of registered content is applied to the content to be registered.

In step S108, the keyword determination unit 64 checks a keyword of the content to be registered, and compares the keyword with a registered keyword. Then, the process proceeds to step S110.

In step S110, the keyword determination unit 64 performs scoring according to a type of the keyword, and the process proceeds to step S112. For example, the keyword determination unit 64 counts the number of keywords matching with keywords in a medical field or keywords in a law field.

In step S112, the LOA determination unit 66 determines an assurance level based on a score of the keyword and a form determination rate, and the assurance level determination processing is ended. For example, the LOA determination unit 66 calculates, as a form determination rate, a matching degree of the content and an image of each form, specifies similar content or a similar form based on the form determination rate and a score of the keyword, and applies an assurance level of the specified content or the specified form. In a case where there is no similar content, the LOA determination unit 66 determines that the assurance level of the content exceeds an allowable registration level, and notifies the user that registration is not allowed.

Figure 7:
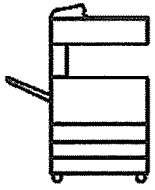
FIG. 7 is a diagram illustrating an example in which the image forming apparatus reads content and registers the content in a content management DB.

For example, a case where the image forming apparatus 12 reads and registers the content to be registered in the content management DB 70 will be described. FIG. 7 is a diagram illustrating an example in which the image forming apparatus 12 reads content and registers the content in the content management DB 70.

A user who logs in instructs reading of the content, for example, by operating a "read" button in a screen illustrated in FIG. 7. Thereby, a screen illustrated in the center of FIG. 7 is displayed on the user interface 22 of the image forming apparatus 12. Here, in a case where the "read" button is operated, the image forming apparatus 12 reads paper, and transmits content obtained by reading the paper to the content management service 50.

In the content management service 50, the processing of FIG. 6 is performed, and the assurance level of the content to be registered is determined. For example, FIG. 7 illustrates an example in a case where it is determined that the assurance level of the content to be registered is level 2 and an example in a case where it is determined that the assurance level of the content to be registered exceeds an allowable registration level.

Figure 8:
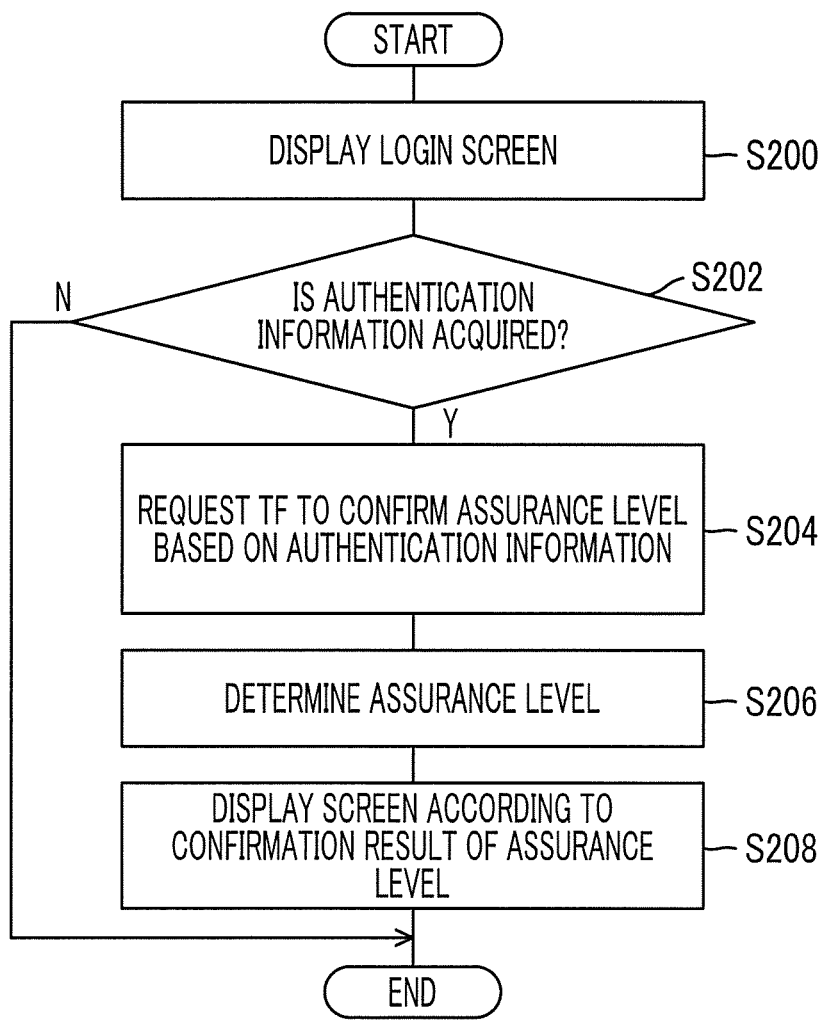
FIG. 8 is a flowchart illustrating an example of a flow of processing performed by the cloud server of the information processing system according to the exemplary embodiment in a case where a client apparatus requests the cloud server providing the content management service to browse content.

Subsequently, processing performed by the cloud server 16 in a case where the client apparatus 11 instructs the content management service 50 to browse the content will be described. FIG. 8 is a flowchart illustrating an example of a flow of processing performed by the cloud server 16 of the information processing system 10 according to the exemplary embodiment in a case where the client apparatus 11 requests the cloud server 16 providing the content management service 50 to browse the content. The processing illustrated in FIG. 8 is started, for example, as illustrated in an upper part of FIG. 9, in a case where an application program A corresponding to the content management service 50 is selected by the client apparatus 11 from among a plurality of application programs (application programs A to C).

Figure 9:
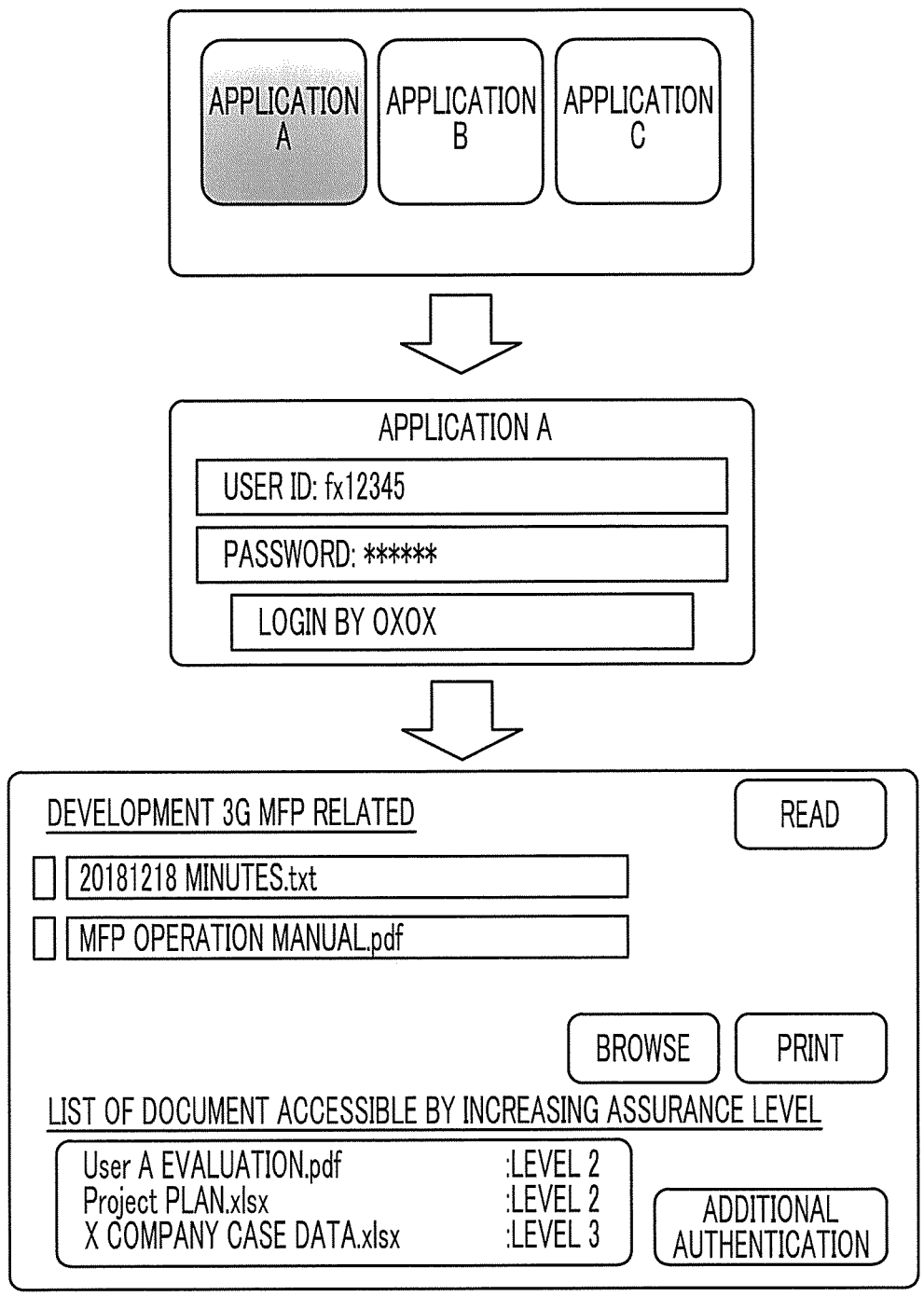
FIG. 9 is a diagram illustrating an example in which a user logs-in and a screen according to an assurance level is displayed.

In step S200, the access management unit 54 displays a login screen on the client apparatus 11, and the process proceeds to step S202. For example, a login screen as illustrated in the center of FIG. 9 is displayed on the user interface 22 of the image forming apparatus 12, a display 14F of the information processing terminal 14, or the like.

In step S202, the access management unit 54 determines whether or not authentication information is acquired. In this determination, it is determined whether or not the client apparatus 11 is operated to input authentication information such as a user ID and a password. In a case where the determination result is Yes, the process proceeds to step S204, and in a case where another operation such as a login cancel operation is performed, the determination result is No and a series of processing is ended.

In step S204, the LOA confirmation unit 60 requests the trust framework (in FIG. 8, referred to as TF) 80 to confirm an assurance level based on the authentication information, and the process proceeds to step S206. That is, the LOA confirmation unit 60 requests the trust framework 80 to confirm an assurance level of a logged-in user.

In step S206, the LOA determination unit 66 determines an assurance level of a logged-in user based on the confirmation result of the LOA confirmation unit 60, and the process proceeds to step S208.

In step S208, the content operation unit 58 displays a screen according to the assurance level, which is determined by the LOA determination unit 66, on the client apparatus 11, and the series of processing is ended. For example, in the exemplary embodiment, in a case where the assurance level of the logged-in user is 1, as illustrated in FIG. 9, two documents of "20181218 minutes.txt" and "MFP operation manual.pdf" are displayed as accessible content.

Next, processing performed in a case where the assurance level is changed during login will be described. FIG. 10 is a flowchart illustrating an example of a flow of processing performed by the cloud server 16 of the information processing system 10 according to the exemplary embodiment in a case where the assurance level is changed by the cloud server 16 providing the content management service 50. The processing of FIG. 10 will be described as processing in a case where the content management service 50 is instructed to browse content.

In step S300, the LOA determination unit 66 displays a list of content, which can be browsed by increasing the assurance level, on the client apparatus 11, and the process proceeds to step S302. For example, as illustrated in an upper part of FIG. 11, as in FIG. 9, two documents are displayed as accessible content, and a list of documents, which can be accessed by increasing the assurance level, is displayed.

In step S302, the LOA changing unit 56 determines whether or not a request for increasing the assurance level is received. In this determination, it is determined whether or not an "additional authentication" button on the screen illustrated in the upper part of FIG. 11 is operated. In a case where the determination result is Yes, the process proceeds to step S304. In a case where another operation is performed and thus the determination result is No, the series of processing is ended, and other processing is performed.

In step S304, the LOA changing unit 56 displays a predetermined additional authentication screen for prompting additional authentication on the client apparatus 11, and the process proceeds to step S306. For example, the LOA changing unit 56 displays an additional authentication screen as illustrated in the center of FIG. 11. The example of FIG. 11 illustrates an example of selecting the assurance level and performing additional authentication for increasing the assurance level to level 2.

In step S306, the LOA changing unit 56 determines whether or not the additional authentication is completed. In this determination, the LOA changing unit 56 accesses the user management/authentication service 74 and determines whether or not additional authentication is performed. In a case where the determination result is Yes, the process proceeds to step S308. In a case where another operation is performed and thus the determination result is No, the series of processing is ended, and other processing is performed.

In step S308, the content operation unit 58 performs display according to the additional authentication result, and the series of processing is ended. For example, as illustrated in a lower part of FIG. 11, the assurance level is increased to level 2, four documents are displayed as accessible content, and a list of documents, which can be accessed by increasing the assurance level, is displayed.

In the exemplary embodiment, an example in which the image forming apparatus 12 reads paper and registers content obtained by reading is described. On the other hand, the present disclosure is not limited to the exemplary embodiment. For example, a form in which content is registered using a method of selecting a local file by a web application may be applied. Alternatively, a form in which an administrator collectively registers content using a comma separated value (CSV) file may be applied.

Further, the processing performed by the image forming apparatus 10 according to the exemplary embodiment may be processing performed by software, processing performed by hardware, or processing performed by a combination of software and hardware. The processing to be performed by each unit of the image forming apparatus 10 may be distributed by being stored in a storage medium, as a program.

The present invention is not limited to the exemplary embodiment, and various modifications may be made without departing from the spirit of the inventions.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   an authentication reception unit that receives authentication information of a user for which a trust relationship is established in advance in a trust framework;
   an determination unit that determines an assurance level of the user;
   a reception unit that receives information to be registered from the user;
   a setting unit that sets the assurance level to the information to be registered which is received by the reception unit among a plurality of predetermined assurance levels;
   a display control unit that controls a display to display a list of registration information registered in advance which is assessable to the user only after increasing the assurance level of the user; and
   an additional authentication reception unit that receives additional authentication required for increasing the assurance level of the user.

2. The information processing apparatus according to claim 1,
   wherein, in a case where the additional authentication reception unit receives the additional authentication, the display control unit controls the display to display the registration information corresponding to the assurance level of the user that has been increased as accessible information.

3. The info nation processing apparatus according to claim 1,
   wherein the setting unit searches for the registration information similar to the information to be registered, from among pieces of the registration information, and sets the assurance level which is set to the searched registration information, to the information to be registered.

4. The information processing apparatus according to claim 1,
   wherein the setting unit searches for the registration information similar to the information to be registered, from among pieces of the registration information, and sets the assurance level which is set to the searched registration information, to the info nation to be registered.

5. The information processing apparatus according to claim 2,
   wherein the setting unit searches for the registration information similar to the information to be registered, from among pieces of the registration information, and sets the assurance level which is set to the searched registration information, to the information to be registered.

6. The information processing apparatus according to claim 3,
   wherein the setting unit searches for a form matching with or similar to the information to be registered, from among forms registered as the registration information, and sets the assurance level which is set to the searched form, to the information to be registered.

7. The information processing apparatus according to claim 4,
   wherein the setting unit searches for a form matching with or similar to the information to be registered, from among forms registered as the registration information, and sets the assurance level which is set to the searched form, to the information to be registered.

8. The information processing apparatus according to claim 5,
   wherein the setting unit searches for a form matching with or similar to the info nation to be registered, from among forms registered as the registration information, and sets the assurance level which is set to the searched form, to the information to be registered.

9. The information processing apparatus according to claim 3,
   wherein the setting unit searches for the similar registration information using a keyword included in the information to be registered.

10. The information processing apparatus according to claim 4,
    wherein the setting unit searches for the similar registration information using a keyword included in the information to be registered.

11. The information processing apparatus according to claim 5,
    wherein the setting unit searches for the similar registration information using a keyword included in the information to be registered.

12. The information processing apparatus according to claim 6,
    wherein the setting unit searches for the similar registration information using a keyword included in the information to be registered.

13. The information processing apparatus according to claim 7,
    wherein the setting unit searches for the similar registration information using a keyword included in the information to be registered.

14. The information processing apparatus according to claim 8,
    wherein the setting unit searches for the similar registration information using a keyword included in the information to be registered.

15. An information processing system comprising:
    the information processing apparatus according to claim 1; and
    a client apparatus that is able to input the authentication information and transmits the information to be registered.

16. An information processing system comprising:
    the information processing apparatus according to claim 1; and
    a client apparatus that is able to input the authentication information and transmits the information to be registered.

17. An information processing system comprising:
the information processing apparatus according to claim 2; and
a client apparatus that is able to input the authentication information and transmits the information to be registered.

18. An information processing system comprising:
the information processing apparatus according to claim 3; and
a client apparatus that is able to input the authentication information and transmits the information to be registered.

19. A non-transitory computer readable medium storing an information processing program for causing a computer to function as each unit of the information processing apparatus according to claim 1.

* * * * *